United States Patent [19]
Brubaker

[11] 3,875,296
[45] Apr. 1, 1975

[54] METHOD OF PREPARING METAL OXIDE FIBERS

[75] Inventor: Burton D. Brubaker, Midland, Mich.

[73] Assignee: The Dow Chemical Company, Midland, Mich.

[22] Filed: Jan. 2, 1973

[21] Appl. No.: 320,677

Related U.S. Application Data

[63] Continuation-in-part of Ser. Nos. 622,046, March 10, 1967, abandoned, and Ser. No. 28,103, April 13, 1970, Pat. No. 3,711,599.

[52] U.S. Cl................ 423/592, 106/58, 117/169 R
[51] Int. Cl............................................. C01g 53/04
[58] Field of Search.................................... 423/592

[56] References Cited
UNITED STATES PATENTS
3,265,464   8/1966   Udd ................................. 423/592

FOREIGN PATENTS OR APPLICATIONS
234,440    7/1961    Australia............................. 423/592
45-36171   11/1970   Japan................................. 423/592

Primary Examiner—Herbert T. Carter
Attorney, Agent, or Firm—Robert W. Selby

[57] ABSTRACT

A method to prepare fibers of nickel oxide and solid solutions of nickel and magnesium oxides by forming a liquid film of a reaction mixture containing at least a nickel salt and a suitable auxiliary salt; reacting the film mixture with water vapor to initiate fibrous growth at a temperature of from about 700°C to 1200°C; continually supplying a film of the mixture over the fibers to sustain growth; and separating the fibers from any residual mixture to thereby produce oxide fibers characterized by a resistance to high temperatures.

36 Claims, No Drawings

METHOD OF PREPARING METAL OXIDE FIBERS

CROSS-REFERENCES TO RELATED APPLICATIONS

This application is a continuation-in-part of applications bearing Ser. No. 622,046, filed Mar. 10, 1967 and now abandoned; and Ser. No. 28,103, filed Apr. 13, 1970, now U.S. Pat. No. 3,711,599.

A primary object of the present invention is to provide a novel method of preparing fibers or so-called whiskers of nickel oxide and/or solid solutions of nickel and magnesium oxides, which is relatively simple to carry out, lower in cost than the prior art methods of making such fibers, and which has the capability of producing large yields of the fibrous product.

SUMMARY OF THE INVENTION

The above and other objects and advantages are obtained in accordance with the present invention in a method comprising: (a) forming a molten film of a mixture of a metal salt with at least one auxiliary salt, the proportion of the metal salt being up to about 80 and preferably from about 0.5 to about 80 mole percent of the mixture; (b) reacting the mixture with water vapor at a temperature within a range of from about 700°C to about 1200°C to initiate metal oxide fiber growth; (c) continually supplying a molten film of the mixture over the fibers to sustain growth; and (d) separating the fibrous metal oxide product from any residual mixture, for example, by treating it with an aqueous leaching solution. The fibrous oxide product so-prepared and obtained comprises, after drying, a loosely packed, bulky, fibrous mass of nickel oxide or solid solutions of nickel and magnesium oxides having a low density, the individual fibers having high temperature resistant properties.

The term "auxiliary salt" as used herein means the alkali metal chlorides and bromides, alkali metal sulfates, calcium, barium or strontium chlorides, or mixtures thereof, employed in a reaction mixture with particular nickel and magnesium inorganic salts as hereinafter specified.

The term "metal salt" means a nickel salt, such as chlorides and sulfates, and the chlorides, bromides and sulfates of magnesium or mixtures thereof.

DESCRIPTION OF THE PREFERRED EMBODIMENTS

In carrying out the process of the present invention a metal salt is admixed with preferably at least about 30 and more preferably at least about 40 mole percent of at least one auxiliary salt to form the reaction mixture. A double salt such as, e.g., carnallite ($MgCl_2 \cdot KCl \cdot 6H_2O$) may also be conveniently used in combination with the nickel salt. In such instance, no separate addition of auxiliary salt is necessary. A mixture of the nickel salt together with either a sodium or potassium halide and especially the chlorides of such alkali metals is preferred as the reaction mixture composition. When calcium chloride and lithium salts are employed they should constitute less than about 60 mole percent and 80 mole percent, respectively, of the auxiliary salt.

Various other combinations, for example, of the nickel salt and auxiliary salts may also be employed in the composition. When solid solutions of magnesium oxide and nickel oxide fibers are desired, the composition will comprise a mixture of magnesium and nickel salts.

In preparing the metal oxide fibers a liquid or molten film of the mixture is formed. This is accomplished, for example, by pouring the mixture in molten form onto a flat or inclined substrate, or, since the mixture is highly wettable, by allowing the liquid to flow up the side of a reaction vessel, e.g., a crucible. To initiate fibrous metal oxide growth, the film mixture is reacted with water vapor, e.g., in the atmosphere surrounding the film, at a temperature above the fusion point of the auxiliary salt and within the range from about 700°C to about 1200°C, preferably about 800°C to about 1100°C. When a major portion of the auxiliary salt mixture is lithium chloride, the temperature is preferably about 700°C to about 1000°C. The reaction at the temperature specified preferably should be maintained for at least about 15 and more preferably at least about 30 minutes, and even more preferably for from about 2 to about 5 hours. Heating times greater than about 5 hours do not significantly increase the fiber length over that obtained during the 2 to 5 hours heating time. It is, however, not particularly detrimental if greater times are employed. Desirably, the dew point in the heating zone is maintained at above about 15°C and more preferably above about 25°C when a nickel salt alone is employed. The preferred minimum dew point in the heating zone for mixtures of nickel and magnesium salts linearly decreases from about 15°C to about −15°C as the magnesium salt content increases to about 100 weight percent.

During reaction, metal oxide is formed by the reaction of the metal ion ($M^{++}$) with a hydroxyl ion ($OH^-$) and an anion ($X^-$):

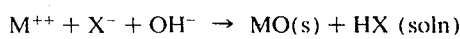

The hydroxyl ions are formed by reaction of the water vapor with an anion ($X^-$)

Where the reaction mixture is a thick mass, the metal oxide forms as granular crystals. However, when the reaction takes place in a film of reaction mixture, as specified in the present method, the growth is unidirectional, causing metal oxide fiber to form. This is due in part to the selective reaction of the hydroxyl ions with the closest edge of the metal oxide nuclei. The "top" of the nucleus, e.g., the edge nearest the film surface, reacts with the hydroxyl ions more readily than the "sides" of the nucleus which are shielded by the mixture film.

To sustain the fibrous growth a liquid film of mixture is continually supplied over the fibers, e.g., by continually pouring molten mixture over the fibers to maintain a film or allowing capillary action to "crawl" or "siphon" a liquid film over the growing fibers.

When the fibers reach the desired length, e.g., a few microns to 10,000 – 12,000 microns, the fibers are separated from any residual mixture. The fibers are contacted with an aqueous solution to leach out the soluble mixture leaving behind the metal oxide fibrous product, which is thereafter normally dried either in an oven at moderate temperatures such as, for example, 100°C or air dried at ambient temperatures.

As an alternative to leaching out the auxiliary salts, where little or no unreacted metal salts are present, the fibers can be further heated to vaporize off the auxiliary salts leaving the metal oxide fibers as product. Fibers at least partially containing metallic nickel can be produced from the described nickel oxide or nickel oxide-magnesium oxide fibers by reducing the nickel oxide to the metal by techniques known to those skilled in the art.

pared in accordance with the present invention by heating mixtures of $NiCl_2 \cdot 6H_2O$ and NaCl or $CaCl_2$ and KCl in varying proportions for periods from ½ to 3 hours at temperatures from 800°C to 1000°C. The fiber lengths obtained and the reaction conditions are presented in Table II.

TABLE II

| Example No. | Mole Per Cent of | | | | Time (hrs) | Temp (°C) | Fiber Length (microns) |
|---|---|---|---|---|---|---|---|
| | $NiCl_2.6H_2O$ | $CaCl_2$ | NaCl | KCl | | | |
| 12 | 10 | — | — | 90 | 2 | 800 | 50 |
| 13 | 5 | — | — | 95 | 3 | 900 | 400 |
| 14 | 10 | — | 90 | — | ½ | 900 | undetermined |
| 15 | 10 | — | — | 90 | 3 | 900 | 500 |
| 16 | 20 | — | — | 80 | 3 | 900 | 350 |
| 17 | 40 | — | — | 60 | 3 | 900 | 300 |
| 18 | 16 | 15 | — | 69 | 2 | 1000 | 700 |
| 19 | 20 | 47 | — | 33 | 2 | 1000 | 250 |

The fibrous oxide yield from the present novel process varies depending on the reaction time, temperature, atmosphere, and reaction composition. In general, the fiber oxide yields can vary from, e.g., about 20 to about 75 percent, based on a 100 percent conversion of the magnesium or nickel salt in the reaction mixture to the fibrous oxide.

The following examples serve to illustrate the present novel process.

EXAMPLES 1–11

Various reaction mixtures were prepared containing nickel chloride ($NiCl_2 \cdot 6H_2O$), magnesium chloride ($MgCl_2$), and as auxiliary salts potassium chloride (KCl) and calcium chloride ($CaCl_2$), then furnace heated in a "Vycor" brand crucible (crucible comprising about 96 percent silica) for the time (hours), and at the centigrade temperature (°C) indicated in Table I. Upon heating, the liquid mixture wet the crucible walls forming a film. Reaction of the mixture with water vapor in the furnace atmosphere caused formation of solid solution fibers. Liquid mixture was supplied by capillary action. Magnesium oxide-nickel oxide solid solution fibers of varying length were obtained. The reaction condition, and proportions of materials are presented in Table I.

EXAMPLES 20–23

Mixtures of a metal salt and an auxiliary salt as shown in Table III were placed in a "Vycor" crucible. The crucible and contents were placed in a furnace and maintained at 1100°C for 30 minutes. The furnace had openings to permit air circulation and exhaust of gaseous by-products. The dew points of the air circulated were 17°C to 20°C.

Upon heating, the mixtures became molten and then wet and crawled up the side of the crucible, forming a film on the inner side walls of the crucible. The mixtures reacted with the water vapor in the atmosphere to form varying amounts of nickel oxide fibers on the inner sides of the crucible. A film of liquid mixture from the reservoir in the crucible was continually supplied over the fibers by capillary action. The fibers were cooled and leached in water to remove any residual mixture.

TABLE III

| Example No. | $NiCl_2.6H_2O$ | Mole Per Cent NaCl | KCl |
|---|---|---|---|
| 20 | 10 | 90 | — |
| 21 | 50 | 50 | — |
| 22 | 10 | — | 90 |
| 23 | 50 | — | 50 |

TABLE I

| Example No. | Mole Per Cent | | | | Time (hours) | Temp °C | Fiber Composition in Mole Per Cent | | Fiber Length (microns) | Mole Ratio in Starting Composition of Ni-to-Mg |
|---|---|---|---|---|---|---|---|---|---|---|
| | $NiCl_2.6H_2O$ | $MgCl_2$ | KCl | $CaCl_2$ | | | NiO | MgO | | |
| 1 | 2.5 | 22.3 | 66.3 | 8.9 | 2 | 900 | 18 | 82 | 125 | 1:9 |
| 2 | 7.4 | 17.3 | 66.4 | 8.9 | 2 | 900 | 45 | 55 | 125 | 3:7 |
| 3 | 12.4 | 12.4 | 66.3 | 8.9 | 2 | 900 | 57 | 43 | 300 | 1:1 |
| 4 | 17.3 | 7.5 | 66.3 | 8.9 | 2 | 900 | 73 | 27 | 750 | 7:3 |
| 5 | 22.3 | 2.5 | 66.3 | 8.9 | 2 | 1000 | 91 | 9 | 300 | 9:1 |
| 6 | 22.3 | 2.5 | 66.3 | 8.9 | 2 | 850 | — | — | 400 | 9:1 |
| 7 | 22.3 | 2.5 | 66.3 | 8.9 | 2 | 950 | — | — | 400 | 9:1 |
| 8 | 22.3 | 2.5 | 66.3 | 8.9 | 2 | 1000 | — | — | 500 | 9:1 |
| 9 | 13.2 | 1.5 | 75.2 | 10.1 | 2 | 1000 | — | — | 1400 | 9:1 |
| 10 | 8.4 | 0.94 | 79.9 | 10.7 | 2 | 1000 | — | — | 800 | 9:1 |
| 11 | 12.9 | 1.4 | 73.4 | 12.3 | 1 | 1000 | — | — | 600 | 9:1 |

EXAMPLES 12–19

Nickel oxide fibers in substantial length were pre-

EXAMPLES 24–30

Nickel oxide fibers were produced substantially as in

Example 1 using a nickel sulfate as shown in Table IV and a gas fired furnace instead of an electrically heated furnace.

TABLE IV

| Example No. | NiSO$_4$.6H$_2$O | Mole Per cent NaCl | KCl | Na$_2$SO$_4$ | Time (min.) | Temperature °C |
|---|---|---|---|---|---|---|
| 24 | 10 | — | 90 | — | 30 | 800 |
| 25 | 50 | 50 | — | — | 30 | 900 |
| 26 | 80 | 20 | — | — | 30 | 900 |
| 27 | 10 | — | 90 | — | 30 | 900 |
| 28 | 50 | — | 50 | — | 30 | 900 |
| 29 | 80 | — | 20 | — | 30 | 900 |
| 30 | 10 | — | — | 90 | 30 | 900 |

EXAMPLES 31–34

Nickel oxide-magnesium oxide fibers were prepared substantially as described for Example 1. Quantities of MgO-NiO fibers were placed in a low walled, open top, nickel container and treated as described in Table V. About one to two grams of each of the oxide fiber samples in Table VI completed the treatment and were at least partially converted to metallic fibers. The results shown in Table VI were obtained by standard X-ray diffraction analysis of the treated fibers.

TABLE V

Oxide Fiber Reduction Procedure a. Positioned the nickel container and oxide fibers in a "Vycor" glass tube within a furnace
b. Passed argon through the tube for a time period of one hour at a gas flow rate of 100 cubic centimeters per minute (ccm)
c. Heated the oxide fibers to and maintained them at a temperature of 400°C for two hours; increased the temperature to 600°C and maintained such temperature for two hours; and, simultaneously with exposure of the oxide fibers to the elevated temperatures, passed gaseous hydrogen through the glass tube at a flow rate of 380 ccm
d. Cooled the fibers within the furnace for about two days while simultaneously passing 150 ccm of hydrogen gas through the glass tube
e. Passed 100 ccm of argon gas through the glass tube for 30 minutes
f. Removed the fiber samples from the furnace
g. Repeated steps (a) through (f) except that the argon flow was 75 ccm; the fibers were heated for 2 hours at 900°C in addition to heating at 400°C and 600°C; and the time periods in (d) and (e) were about 15 hours and one hour, respectively

TABLE VI

| Example No. | Fiber Composition (weight percent) Before Reduction | | Metallic Nickel After Reduction |
|---|---|---|---|
| 31 | MgO | 82 | less than 5 |
|    | NiO | 18 |   |
| 32 | MgO | 55 | about 5 |
|    | NiO | 45 |   |
| 33 | MgO | 43 | 30 to 40 |
|    | NiO | 57 |   |
| 34 | MgO | 27 | 70 to 80 |
|    | NiO | 73 |   |

EXAMPLE 35

About 2 to 3 grams of nickel oxide fiber formed in accord with the present invention were processed substantially in accord with Example 31 and steps (a) through (f) of Table V. The reduced fiber was analyzed by standard X-ray diffraction methods and determined to contain 90 to 95 weight percent metallic nickel with the balance being nickel oxide.

Other combinations of nickel salts or mixtures of nickel and magnesium salts with one or more auxiliary salts in accordance with the present invention can be processed to provide nickel oxide or nickel oxide-magnesium oxide fibers of substantial length characterized by their resistance to high temperatures similarly as hereinbefore specified.

The present invention may be modified or changed without departing from the spirit, scope, or substance of the present invention and it is understood that the invention is only limited as defined in the appended claims.

What is claimed is:

1. A method for preparing nickel oxide fibers which comprises: forming a molten film of a mixture of a nickel salt with at least one auxiliary salt selected from the group consisting of alkali metal chlorides, alkali metal bromides, alkali metal sulfates, and calcium, barium or strontium chlorides, the proportion of nickel salt in the mixture being up to about 80 mole percent; reacting the mixture with water vapor at a temperature within the range of from about 700°C to about 1200°C to initiate growth of the metal oxide fibers; continually supplying the molten film of the mixture over the fibers to sustain growth; and separating the metal oxide fibers from any residual mixture.

2. The method of claim 1 wherein the reaction is carried out at a temperature within the range of from about 800°C to about 1100°C.

3. The method of claim 1 wherein the auxiliary salt is at least one member selected from the group consisting of alkali metal chlorides, alkali metal bromides, alkali metal sulfates, and calcium, barium or strontium chlorides, provided that the auxiliary salt includes less than about 60 mole percent calcium chloride and less than about 80 mole percent of a lithium salt.

4. The method of claim 3 wherein the dew point is maintained at above about 15°C.

5. The method of claim 3 wherein the dew point is maintained at above about 25°C.

6. The method of claim 1 wherein the nickel salt is a chloride.

7. The method of claim 6 wherein the mixture contains at least about 30 mole percent of the auxiliary salt.

8. The method of claim 1 wherein the auxiliary salt is at least one member selected from the group consisting of sodium and potassium halides.

9. The method of claim 8 wherein the halides are chlorides.

10. The method of claim 9 wherein the nickel salt is selected from the group consisting of chlorides and sulfates.

11. The method of claim 9 wherein the nickel salt is a chloride.

12. The method of claim 10 wherein the mixture contains at least about 30 mole percent of the auxiliary salt.

13. The method of claim 10 wherein the mixture contains at least about 40 mole percent of the auxiliary salt.

14. The method of claim 10 wherein the mixture contains about 0.5 to about 70 mole percent of the nickel salt.

15. The method of claim 14 wherein the dew point is maintained at above about 25°C.

16. The method of claim 14 wherein the dew point is maintained at above about 25°C.

17. The method of claim 1 wherein the dew point is maintained at above about 15°C.

18. The method of claim 1 wherein the dew point is maintained at above about 25°C.

19. A method for preparing nickel oxide fibers which comprises:
   a. providing a mixture containing up to about 80 mole percent of a nickel salt and an auxiliary salt selected from at least one member of the group consisting of alkali metal chlorides and bromides, alkali metal sulfates, and calcium, barium or strontium chlorides, provided that the auxiliary salt includes less than about 60 mole percent calcium chloride and less than about 80 mole percent of a lithium chloride;
   b. forming a nucleus of metal oxide on a solid substrate wetted by a molten mixture of step (a) by reacting the molten mixture with water vapor at a temperature within the range of 700°C to about 1200°C;
   c. forming a molten film with the mixture of step (a) over the nucleus;
   d. reacting at least a portion of the film over the nucleus with water vapor at a temperature within the range of about 700°C to about 1200°C to thereby produce a fiber by substantially unidirectional growth of the metal oxide reaction product;
   e. continually supplying the molten film over the fiber ends for at least about 15 minutes to sustain substantially unidirectional growth of the metal oxide; and
   f. separating the metal oxide fibers from any residual mixture.

20. The method of claim 16 wherein the auxiliary salt is at least one member selected from the group consisting of sodium and potassium halides.

21. The method of claim 20 wherein the halide is a chloride.

22. The method of claim 21 wherein the nickel salt is a chloride.

23. The method of claim 21 wherein the nickel salt is a sulfate.

24. The method of claim 21 wherein the nickel salt is a chloride or a sulfate, the reacting temperature is about 900°C to about 1100°C, the molten film is continuously supplied over the fiber ends for at least about 30 minutes, and a fibrous mass of nickel oxide containing fibers is recovered.

25. The method of claim 19 wherein the reacting temperature of step (d) is about 800°C to about 1100°C.

26. The method of claim 19 wherein the molten film is continually supplied over the fiber ends for at least about 30 minutes.

27. The method of claim 19 wherein the nickel salt is a sulfate.

28. The method of claim 19 wherein the molten film of step (c) is formed by pouring the molten mixture onto an inclined substrate.

29. The method of claim 19 wherein the molten film is formed by continually supplying the molten mixture onto the fiber ends by capillary action.

30. The method of claim 19 including recovering a fibrous mass of nickel oxide.

31. The method of claim 19 wherein the nickel salt is a chloride.

32. The method of claim 19 wherein the dew point is maintained at above about 15°C.

33. The method of claim 19 wherein the dew point is maintained at above about 25°C.

34. The method of claim 19 wherein the mixture contains about 0.5 to 70 mole percent of the nickel salt.

35. The method of claim 34 wherein the dew point is maintained at above about 15°C.

36. The method of claim 34 wherein the dew point is maintained at above about 25°C.

* * * * *

UNITED STATES PATENT OFFICE
CERTIFICATE OF CORRECTION

PATENT NO. : 3,875,296
DATED : April 1, 1975
INVENTOR(S) : Burton D. Brubaker

It is certified that error appears in the above-identified patent and that said Letters Patent are hereby corrected as shown below:

Column 8, line 8, change "16" to --19--;

Column 8, line 19, change "900°C" to --800°C--.

Signed and sealed this 15th day of July 1975.

(SEAL)
Attest:

RUTH C. MASON
Attesting Officer

C. MARSHALL DANN
Commissioner of Patents
and Trademarks